United States Patent [19]

Tatani et al.

[11] 4,166,838

[45] Sep. 4, 1979

[54] PROCESS FOR TREATING EXHAUST GASES

[75] Inventors: Atsushi Tatani; Kenichi Yoneda, both of Hiroshima; Yasuyuki Inoue, Musashino; Masumi Atsukawa, Hiroshima, all of Japan

[73] Assignee: Mitsubishi Jukogyo Kabushiki Kaisha, Tokyo, Japan

[21] Appl. No.: 730,178

[22] Filed: Oct. 7, 1976

[30] Foreign Application Priority Data

Oct. 28, 1975 [JP] Japan ................................ 50/128847

[51] Int. Cl.² ............................................ C01B 17/00
[52] U.S. Cl. .................................... 423/242; 423/166
[58] Field of Search ............................... 423/242–244, 423/166, 545, 357, 164

[56] References Cited

U.S. PATENT DOCUMENTS

| | | | |
|---|---|---|---|
| 2,073,039 | 3/1937 | Wilton et al. | 423/242 |
| 2,080,779 | 5/1937 | Lessing | 423/242 |
| 3,888,968 | 6/1975 | Atsukawa et al. | 423/242 |
| 3,903,243 | 9/1975 | Atsukawa et al. | 423/242 |
| 3,961,020 | 6/1976 | Seki | 423/244 X |
| 3,961,021 | 6/1976 | Morita et al. | 423/242 |
| 3,972,980 | 8/1976 | Lowell | 423/242 |
| 4,046,856 | 9/1977 | Itoo et al. | 423/166 |

*Primary Examiner*—O. R. Vertiz
*Assistant Examiner*—Gregory A. Heller

[57] ABSTRACT

A process for exhaust gas desulfurization by the wet lime-gypsum process comprises an absorption step for scrubbing the exhaust gases with a calcium hydroxide slurry as an absorbent; an oxidizing step for oxidizing a slurry composed chiefly of calcium sulfite from the absorption step; and a solids-liquid separation step for separating a slurry composed mainly of gypsum from the oxidizing step, characterized in that the liquid from said solids-liquid separation step is passed into a sulfate impurity reaction step where said liquid reacts with added calcium hydroxide and is thereby freed from water-soluble sulfate impurities; and the so purified liquid is supplied to the absorbent preparation step where it is mixed with calcium hydroxide to form said absorbent. Also, precipitates formed in said sulfate impurity reaction step are supplied to said absorbent preparation step.

2 Claims, 3 Drawing Figures

PROCESS FOR TREATING EXHAUST GASES

This invention relates to improvements in a process for preparing an absorbent to be used in the treatment of exhaust gases. More particularly, the invention concerns a process for treating exhaust gases without the danger of gypsum scaling in the course of absorbent preparation or utilization.

In order to minimize the volume of water to be discharged from the system during exhaust gas desulfurization by the wet lime-gypsum process, it has been customary to recycle the liquid, obtained by solids-liquid separation of the slurries from the absorption and oxidizing steps and containing, respectively, calcium sulfite and gypsum as the chief ingredients, for use in preparing further quantities of the absorbent.

The flow sheet for one type of a conventional exhaust gas desulfurization process is shown in FIG. 1. Exhaust gases from a line 1 are introduced to a treating step I (the step being referred to as an absorption step hereinafter), scrubbed with an absorbent slurry fed from a line 2, and discharged through a line 3. The absorption step I is supplied with make-up water from a line 10. The slurry taken out of the step I into a line 4 is composed mainly of calcium sulfite. It is passed into an oxidizing step II where it is oxidized to a slurry containing gypsum as the principal component and this slurry flows out through a line 5. Meanwhile, part of the calcium sulfite-bearing slurry bypasses the oxidizing step II as it flows from the line 4 through a branch line 6 and merges with the oxidized stream at an intermediate point of the line 5.

The mixed slurry then enters a solids-liquid separation step III where it is separated into solids and liquid. The solids are recovered as by-products from a line 7, while the liquid is sent via a line 8 to an absorbent preparation step IV, where the aqueous liquid is mixed with the material for preparing the absorbent. From the line 8, the liquid is partly removed into a waste treating step V and is thereafter discharged out of the system.

Unslaked or slaked lime or limestone, to be used as an absorbent material in the wet exhaust gas desulfurization process described above, usually contains impurities such as magnesium compounds. Also, the exhaust gases to be treated, namely flue gases from oil-fired boilers, may be partly desulfurized in advance with ammonia and, as a result, contain ammonium salts as impurities. Thus, recycling the liquid in the manner described leads to increases in the concentrations of magnesium sulfate, ammonium sulfate and other sulfate impurities in the liquid. In the absorbent preparation step, those sulfates undergo replacement reactions with the absorbent to form gypsum, which then precipitates on the inner walls of the apparatus used for absorbent preparation until plugging takes place. To avoid such scaling, it has been the practice to discharge an increased volume of water from the system in order to avoid an accumulation of the sulfate impurities.

An object of the present invention is to provide a process for treating exhaust gases in which the volume of water to be discharged from the system is remarkably decreased and in which there is no possibility of gypsum scaling during the course of absorbent preparation and utilization.

To realize this object, the invention consists in a process for treating exhaust gases by use of a calcium compound as an absorbent material, characterized in that the liquid to be used for the preparation of the absorbent and containing the sulfate impurities is reacted with calcium hydroxide to remove such water-soluble impurities, and the resulting sulfate-free liquid is supplied to the absorbent preparation step.

The invention also resides in a process for treating exhaust gases, characterized in that the precipitate obtained in the sulfate impurity removal step is supplied to the absorption step.

Other objects and advantages of the present invention will become apparent from the following description taken in connection with the accompanying drawings, wherein:

In FIG. 2, the corresponding reference numerals designate like parts to those in FIG. 1.

Figure 1:
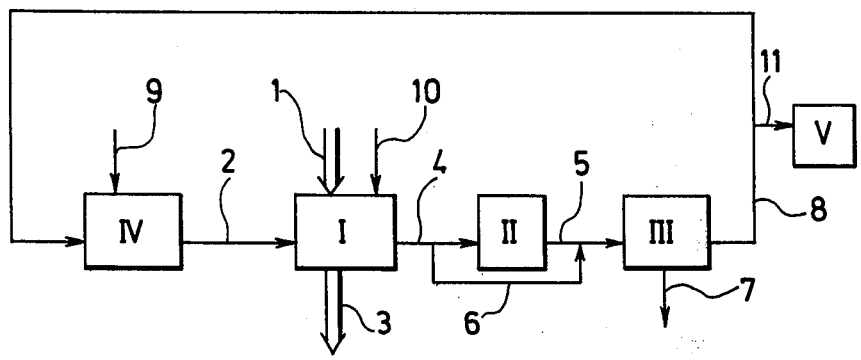
FIG. 1 is a flow sheet of a one type of the conventional exhaust gas desulfurization process.
Figure 2:
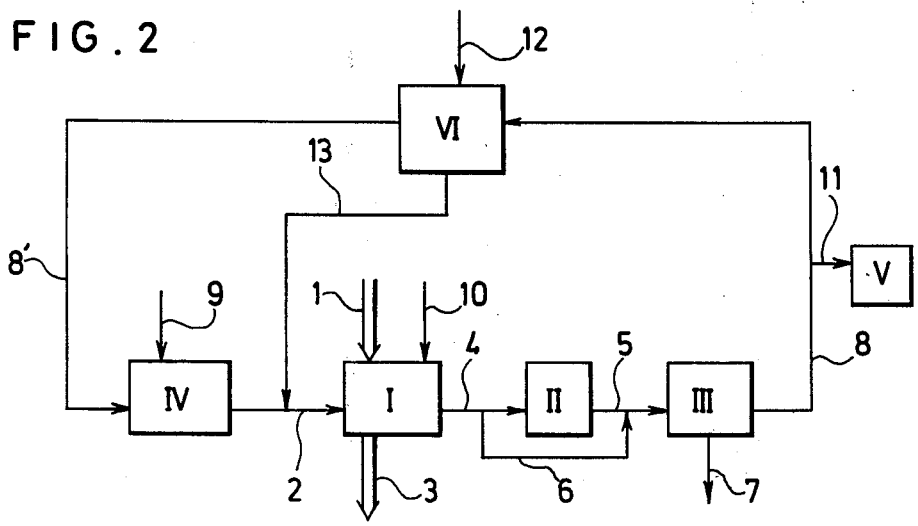
FIG. 2 is a flow sheet of the process for treating exhaust gases in accordance with the present invention.

Referring to FIG. 2, the liquid from the solids-liquid separation step III contains the above-mentioned sulfates dissolved as impurities. The liquid is conducted to a sulfate impurity reaction vessel VI, where it meets $Ca(OH)_2$ fed from a line 12 to undergo replacement reactions as follows:

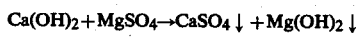

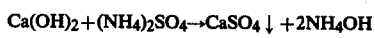

The sulfate impurity reaction vessel VI is of the type that promotes the grain growth of the deposits; for example, an ordinary crystallizer may be employed. The amount of $Ca(OH)_2$ to be used here is desirably substantially equivalent to the combined amount of the sulfate impurities.

On the bottom of the reaction vessel VI, the $CaSO_4$ and $Mg(OH)_2$ formed by the replacement reactions are concentrated as depositing solids. The mixture of the reaction products above the depositing solids is a slurry the density of which decreases as the height from the bottom increases. From the upper part of the vessel VI, a liquid practically free from solids overflows.

The overflow from the vessel contains little or no sulfate impurities dissolved therein, and is introduced through a line 8' to an absorbent preparation step IV.

The principal purpose of the absorbent preparation step IV is to slake quicklime and form a slurry of absorbent material suited for the absorption of SOx.

Should the water to be used in the step IV for absorbent preparation contain soluble sulfates as impurities, the sulfates will react instantaneously with a large excess of $Ca(OH)_2$. The reaction products will readily precipitate and grow as scale on the inner walls of the equipment. However, in accordance with this invention, these reactions are so positively carried out in the sulfate impurity reaction vessel VI that the absorbent preparation step IV has no scaling problem. The $CaSO_4$, formed in this reaction, acts as seed crystals (as mentioned below) and therefore has no possibility of inducing scaling.

Further, according to the present invention, the thick slurry drawn out of the sulfate impurity reaction vessel VI is sent through a line 13 to an intermediate point of a line 2, where it joins the absorbent slurry, and the resulting mixture is fed to an absorption step I. The thick slurry contains a large proportion of the gypsum produced by the replacement reactions, and the gypsum acts as seed crystals in the absorption step I to avoid scaling therein.

In the process of the invention, the hydroxides such as $Mg(OH)_2$ and $NH_4OH$, formed by the aforesaid replacement reactions, are carried by the absorbent slurry into the absorption step I, where they advantageously have an absorbent action.

Where limestone is utilized as the absorbent material, its low alkalinity as compared with slaked lime retards the replacement reactions with the impurity sulfates. Thus, scaling can be precluded in the absorbent preparation step without the need of the sulfate impurity reaction vessel according to the invention. Even so, the invention is applicable so as to effect positive reactions of sulfate impurities with $Ca(OH)_2$; the reactions will yield gypsum and hydroxides, which then will act in the manner above described to enhance the process capacity of exhaust gas treatment systems.

The present invention is illustrated by the following example.

EXAMPLE

Figure 3:
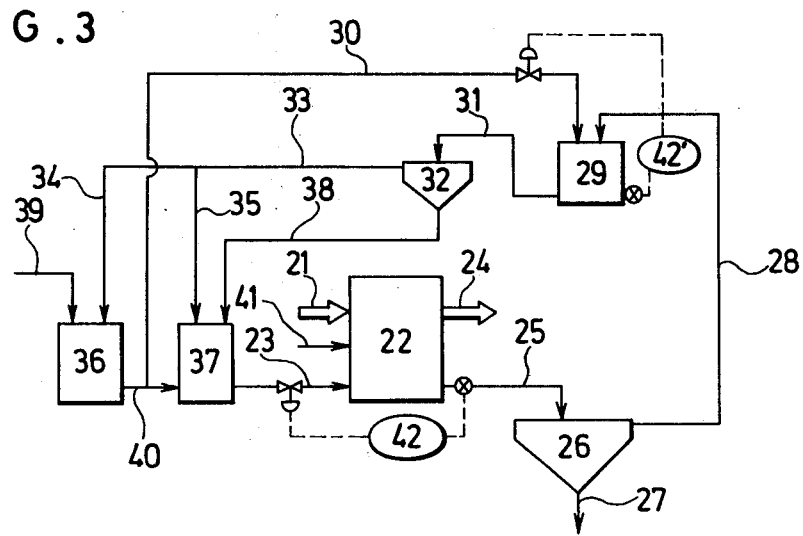
FIG. 3 is a flow sheet of a pilot plant in which the process of the present invention was carried into practice by way of exemplification.

Flue gases from an oil-fired boiler that had been partly desulfurized by ammonia injection were humidified and cooled in a cooling tower and then treated in a pilot plant with a capacity of approximately 2000 $Nm^3/Hr$. A flow sheet of the pilot plant is given in FIG. 3. As shown, the gases to be treated are introduced from a line 21 to an absorption tower 22 where they are scrubbed with an absorbent slurry supplied from a line 23, and are discharged by way of a line 24. Also from the absorption tower 22 the slurry is taken out via a line 25 and is subjected to solids-liquid separation in a first thickener 26. The solids are removed through a line 27, while the liquid is passed through a line 28 into a sulfate impurity reaction vessel 29, which is supplied with $Ca(OH)_2$ from a line 30. The resulting slurry from the reaction vessel 29 is sent via a line 31 to a second thickener 32, where it is separated into solids and liquid. The liquid overflows the thickener into lines 33 and 34 and thence into a quicklime slaking tank 36. Some of the liquid passes into a line 35 and thence to a tank 37, where the concentration of an absorbent slurry is adjusted. The thickened slurry is transferred from the thickener 32 to the absorbent slurry concentration adjusting tank 37 via a line 38. Quicklime fed to the slacking tank 36 through a line 39 is slaked there with the liquid from the line 34, and the product is passed into the absorbent slurry concentration adjusting tank 37 via the line 40. Part of the stream from tank 36 passes into the line 30 and thence to the sulfate impurity reaction vessel 29. From the absorbent slurry concentration adjusting tank 37, an absorbent slurry is supplied to the absorption tower 22 through the line 23. The numeral 41 designates a line for make-up feed to the absorption tower 22, and 42 and 42' designate pH controllers.

The conditions of treatment in the pilot plant and the results attained will now be described in the order of operation.

The conditions (mean values) of the exhaust gases at the inlet of the absorption tower 22 are given in Table 1, and the composition of the absorbent material in Table 2.

Table 1

| | |
|---|---|
| Exhaust gas flow rate | 2000 $Nm^3/Hr$ |
| Exhaust gas temperature | 55° C. |
| $SO_2$ concentration | 1200 ppm |

Table 2

| | | |
|---|---|---|
| CaO | 94.8 | wt% |
| MgO | 2.1 | " |
| Others | 3.1 | " |

After the absorption treatment, the $SO_2$ concentration of the exhaust gases at the outlet of the absorption tower 22 was determined to be 55 ppm. The exiting slurry composition was as shown in Table 3.

Table 3

| | | |
|---|---|---|
| $CaSO_3 . \frac{1}{2}H_2O$ | 0.388 | mol/l |
| $CaSO_4 . 2H_2O$ | 0.410 | " |
| $CaCO_3$ | 0.045 | " |
| $MgSO_4$ | 0.140 | " |
| $(NH_4)_2SO_4$ | 0.032 | " |

This slurry was passed into the first thickener 26, and a sludge with a solids concentration of 68 wt% was recovered through the line 27; the liquid that overflowed the thickener at an average flow rate of 100 l/Hr was passed into the line 28. Table 4 shows the composition of the overflow.

Table 4

| | | |
|---|---|---|
| $MgSO_4$ | 0.140 | mol/l |
| $(NH_4)_2SO_4$ | 0.032 | " |
| $CaSO_4$ | 0.021 | " |

This overflow was conducted to the sulfate impurity reaction tank 29, which was equipped with a slow stirrer and had a holdup capacity of 300 l. The reaction tank 29 was supplied with the $Ca(OH)_2$ slurry from the line 30 in order to maintain the pH of the slurry inside the tank in the range from 10.5 to 11.0.

The slurry leaving the sulfate impurity reaction tank 29 was directed to the second thickener 32, where the charge was separated into overflow for delivery through the line 33 and the thick slurry for delivery through the line 38. The overflow composition was as shown in Table 5.

Table 5

| | |
|---|---|
| $Mg^{++}$ | Under 0.001 mol/l |
| $SO_4^{--}$ | 0.031 mol/l |

The overflowing liquid was supplied to the quicklime slaking tank 36 and the absorbent slurry concentration adjusting tank 37. The total volume of the thick slurry (with a gypsum concentration of 26 wt%) was supplied to the adjusting tank 37.

After 200 hours of operation with the treating procedure described above, there was no trace of gypsum scaling on the inner walls of the quicklime slaking tank 36 and the absorbent slurry concentration adjusting tank 37. No scale appeared in the impurity reaction tank 29, either.

What is claimed is:

1. In a process for exhaust gas desulfurization by the wet lime-gypsum process wherein a part of the sulfur values in the exhaust gas have previously been converted to ammonium sulfate, said process including the following steps:

(a) an absorbent preparation step to prepare a calcium hydroxide—magnesium hydroxide absorbent slurry from quicklime;
(b) an absorption step for scrubbing the exhaust gas with the absorbent slurry of step (a);
(c) an oxidizing step for oxidizing a slurry composed chiefly of calcium sulfite from the absorption step; and
(d) a solids-liquid separation step for separating a slurry composed mainly of gypsum from the oxidizing step, the improvement comprising,
(e) passing the liquid from said solids-liquid separation step (d) into a sulfate impurity reaction step where magnesium sulfate and ammonium sulfate in said liquid are reacted with calcium hydroxide added in an amount which is substantially equivalent to the combined amount of said magnesium and ammonium sulfates, and the liquid is thereby freed from said magnesium and ammonium sulfates, thus forming a purified liquid; and (f) the so purified liquid is supplied to the absorbent preparation step (a) when it is mixed with additional quicklime to form additional quantities of said absorbent slurry.

2. A process as defined in claim 1, wherein the precipitates formed in said sulfate impurity reaction step are supplied to said absorption step.

* * * * *